United States Patent
Rogers, Jr. et al.

(10) Patent No.: US 6,957,829 B2
(45) Date of Patent: Oct. 25, 2005

(54) TENSION SENSING ASSEMBLY

(75) Inventors: Lloyd W. Rogers, Jr., Shelby Township, MI (US); David C. Camp, Warren, MI (US); Richard Sickon, Rochester Hills, MI (US); Theodore J. Lindsay, Utica, MI (US)

(73) Assignee: Delphi Technologies, Inc., Troy, MI (US)

(*) Notice: Subject to any disclaimer, the term of this patent is extended or adjusted under 35 U.S.C. 154(b) by 219 days.

(21) Appl. No.: 10/434,299

(22) Filed: May 8, 2003

(65) Prior Publication Data
US 2004/0004350 A1 Jan. 8, 2004

Related U.S. Application Data

(60) Provisional application No. 60/379,460, filed on May 10, 2002.

(51) Int. Cl.⁷ ............................................. B60R 22/00
(52) U.S. Cl. .................................. 280/801.1; 180/286
(58) Field of Search ..................... 180/268; 280/801.1, 280/735; 73/862.393, 862.392, 862.391, 73/862.69; 340/457.1

(56) References Cited

U.S. PATENT DOCUMENTS

| | | | |
|---|---|---|---|
| 3,618,378 A | 11/1971 | Shull et al. | |
| 3,784,972 A | 1/1974 | Hults | |
| 3,817,093 A | 6/1974 | Williams | |
| 3,868,662 A | 2/1975 | Russell, Jr. | |
| 4,424,509 A | 1/1984 | Andres et al. | |
| 4,574,911 A | 3/1986 | North | |
| 4,677,861 A | 7/1987 | Bartholomew | |
| 4,742,886 A | 5/1988 | Sato | |
| 4,805,467 A | 2/1989 | Bartholomew | |
| 4,943,087 A | 7/1990 | Sasaki | |
| 4,979,400 A | 12/1990 | Bartholomew | |
| 5,060,977 A | 10/1991 | Saito | |
| 5,087,075 A | 2/1992 | Hamaue | |
| 5,181,739 A | 1/1993 | Bauer et al. | |
| 5,309,135 A | 5/1994 | Langford | |
| 5,364,129 A | 11/1994 | Collins et al. | |
| 5,454,591 A | 10/1995 | Mazur et al. | |
| 5,494,311 A | 2/1996 | Blackburn et al. | |
| 5,570,903 A | 11/1996 | Meister et al. | |
| 5,570,932 A | 11/1996 | Collins et al. | |
| 5,583,476 A | 12/1996 | Langford | |

(Continued)

FOREIGN PATENT DOCUMENTS

WO WO 99/55559 11/1999

OTHER PUBLICATIONS

"Magnetic Field Sensors for Magnetic Position Sensing in Automotive Applications", Joseph P. Heremans, General Motors Research and Development Corporation, Apr. 1, 1997.

*Primary Examiner*—David R. Dunn
(74) *Attorney, Agent, or Firm*—Scott A. McBain

(57) ABSTRACT

A tension sensing assembly for a seat restraint system in a vehicle includes a rigid frame of a seat restraint buckle of the seat rstraint system. The tension seensing assembly also includes a movable member mounted on the rigid frame and adapted to be connected to vehicle structure. The movable member is movable relative to the rigid frame. The tension sensing assembly furtheer includes a magnet mounted to the rigid frame and a Hall effect sensor mounted to the movable member and cooperable with the magnet to change an output of the Hall effect sensor to indicate a tension level in the seat restraint system.

16 Claims, 6 Drawing Sheets

U.S. PATENT DOCUMENTS

| | | |
|---|---|---|
| 5,590,904 A | 1/1997 | Ellis et al. |
| 5,605,348 A | 2/1997 | Blackburn et al. |
| 5,618,056 A | 4/1997 | Schoos et al. |
| 5,636,864 A | 6/1997 | Hori |
| 5,728,953 A | 3/1998 | Beus et al. |
| 5,732,974 A | 3/1998 | Sayles |
| 5,775,618 A | 7/1998 | Krambeck |
| 5,831,172 A | 11/1998 | Kidd |
| 5,871,232 A | 2/1999 | White |
| 5,960,523 A | 10/1999 | Husby et al. |
| 5,965,827 A | 10/1999 | Stanley et al. |
| 5,996,421 A | 12/1999 | Husby |
| 6,081,759 A | 6/2000 | Husby et al. |
| 6,161,439 A | 12/2000 | Stanley |
| 6,205,868 B1 | 3/2001 | Miller |
| 6,209,915 B1 | 4/2001 | Blakesley |
| 6,230,088 B1 | 5/2001 | Husby |
| 6,301,977 B1 | 10/2001 | Stojanovski |
| 6,336,371 B1 | 1/2002 | O'Boyle |
| 6,363,793 B2 | 4/2002 | O'Boyle |
| 6,400,145 B1 | 6/2002 | Chamings et al. |
| 6,454,304 B1 | 9/2002 | Steffens, Jr. |
| 6,502,860 B1 | 1/2003 | Siegfried et al. |
| 6,508,114 B2 | 1/2003 | Lawson |
| 6,520,540 B1 | 2/2003 | Siegfried et al. |
| 6,554,318 B2 | 4/2003 | Kohut et al. |
| 6,566,869 B2 * | 5/2003 | Chamings et al. ..... 324/207.26 |
| 6,749,038 B2 * | 6/2004 | Sullivan et al. ............. 180/268 |
| 2002/0104383 A1 | 8/2002 | Chamings et al. |
| 2003/0024326 A1 | 2/2003 | Blakesley et al. |
| 2003/0122361 A1 * | 7/2003 | Kaltenbacher et al. ... 280/801.1 |

* cited by examiner

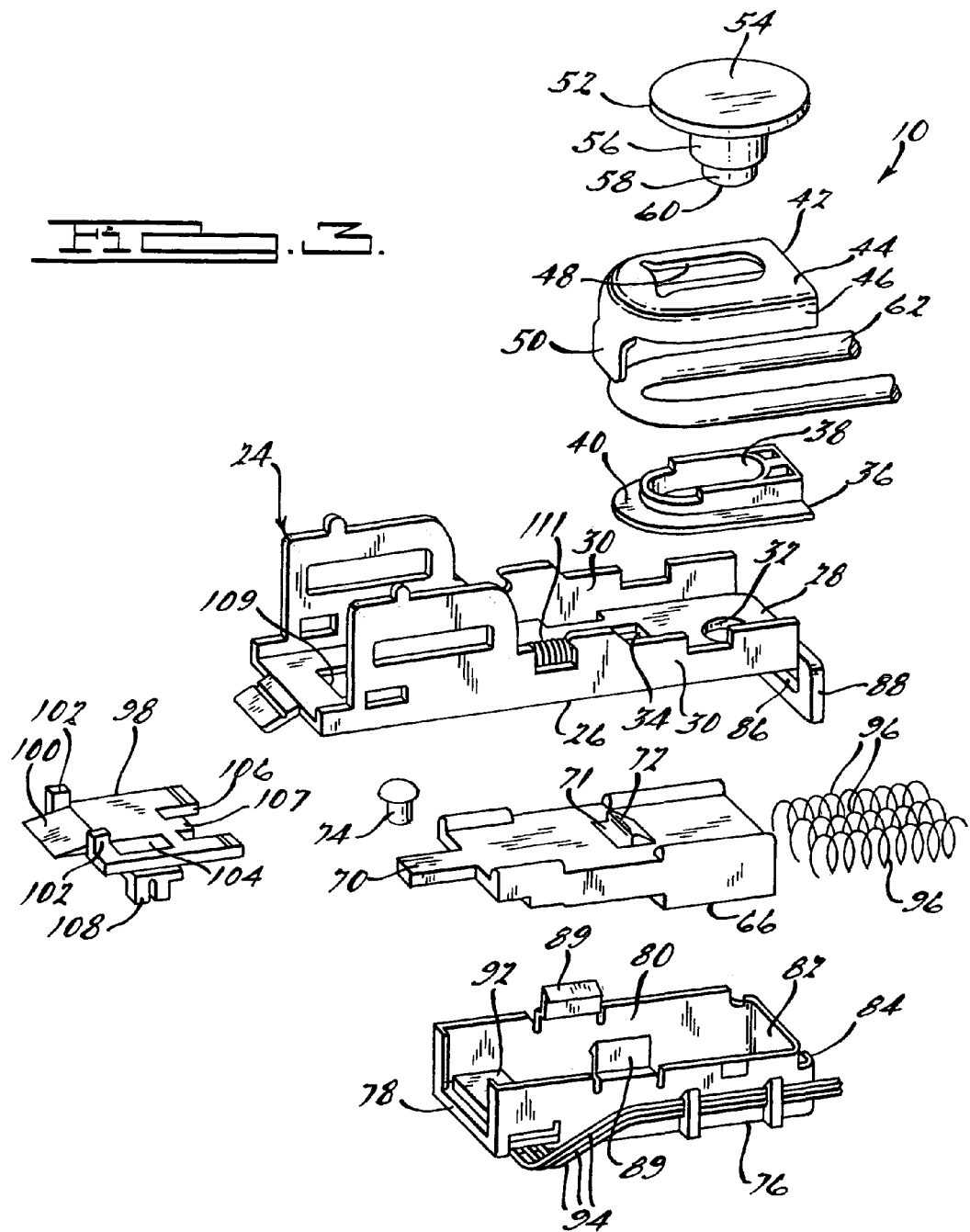

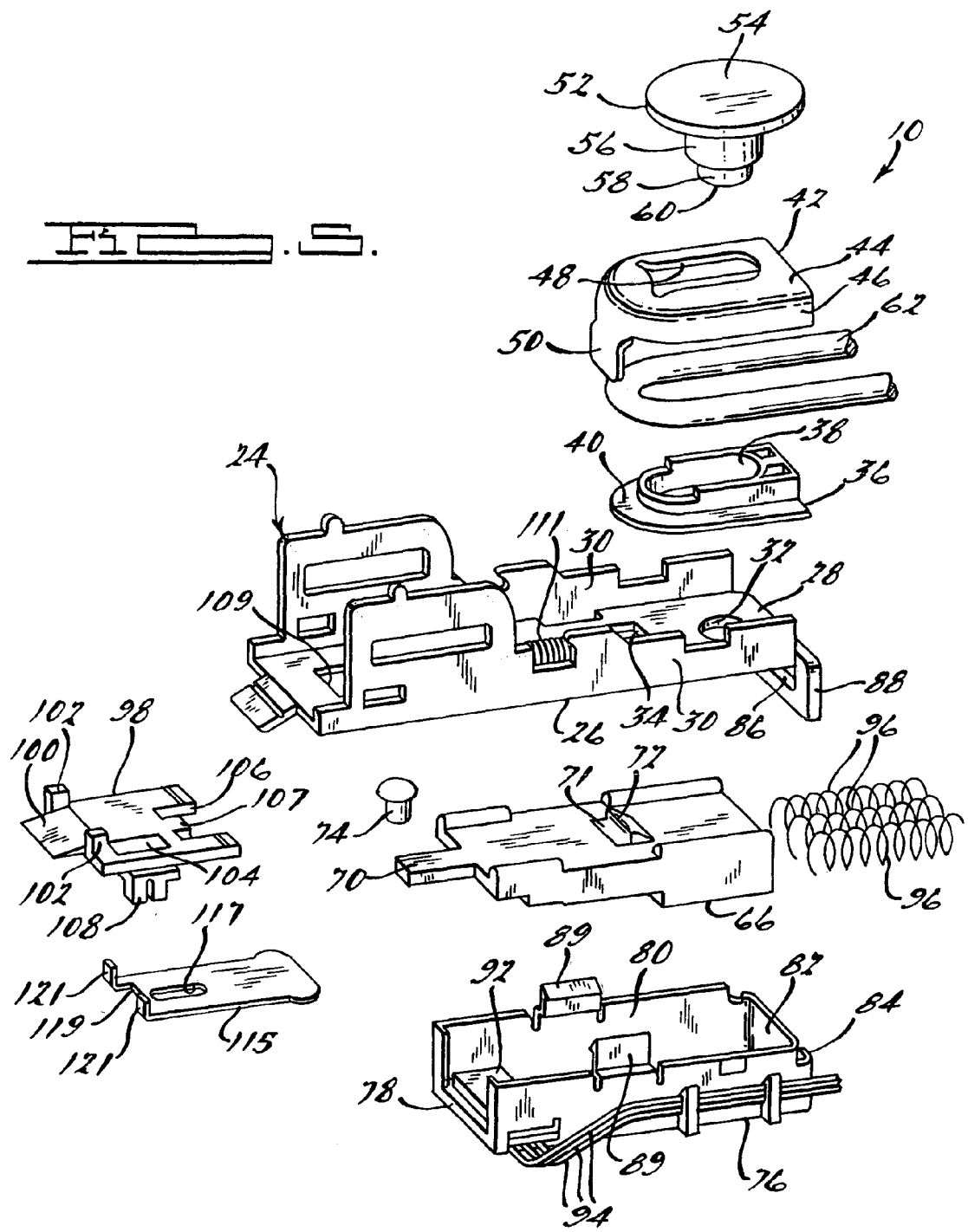

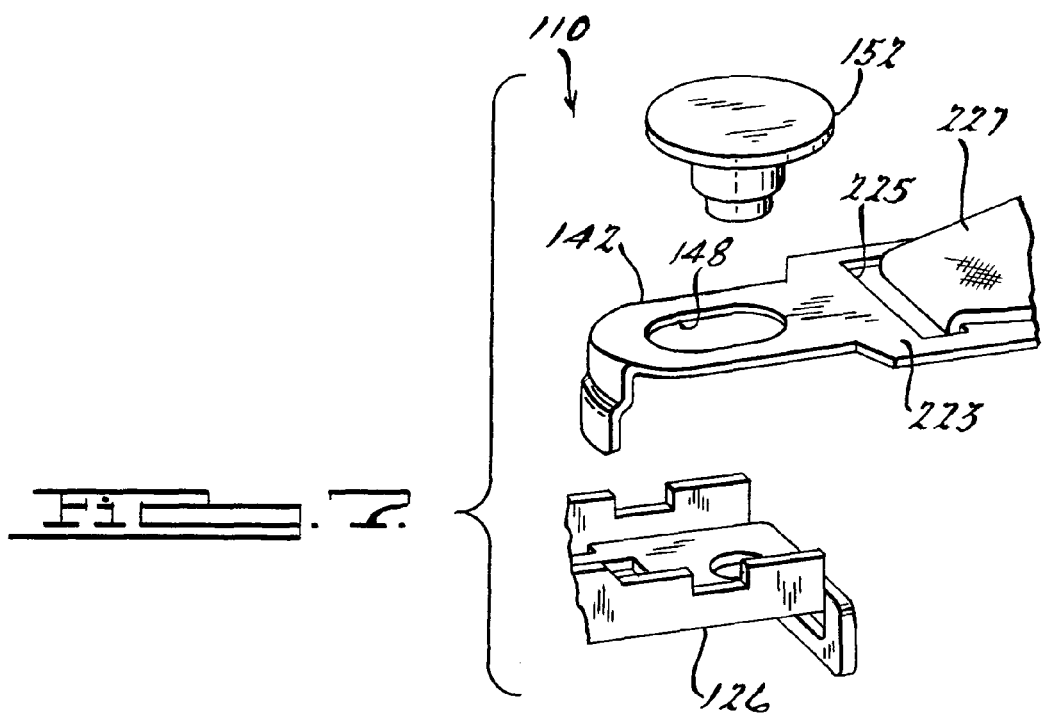
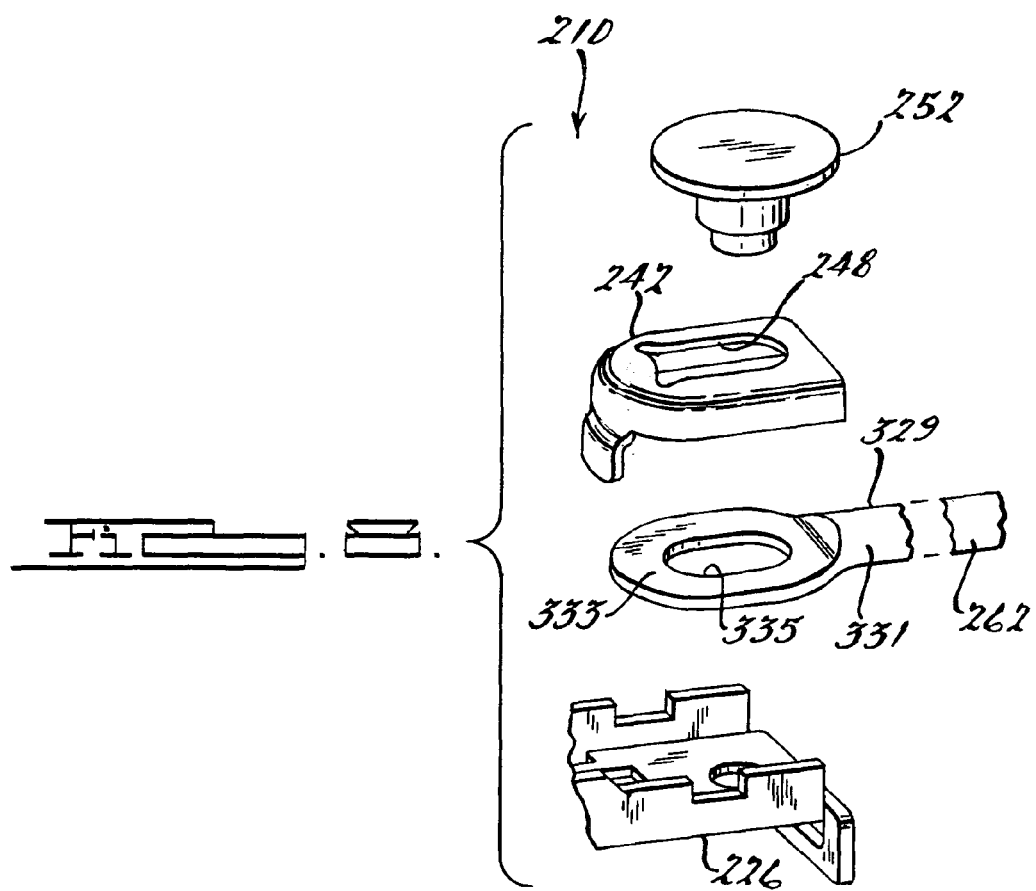

TENSION SENSING ASSEMBLY

CROSS-REFERENCE TO RELATED APPLICATION(S)

The present invention claims the priority date of copending U.S. Provisional Patent Application Ser. No. 60/379,460, filed May 10, 2002.

TECHNICAL FIELD

The present invention relates generally to seat restraint systems for vehicles and, more particularly, to a tension sensing assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment of inflatable restraints depend on information supplied by sensors in the seat in determining weight of an object in the seat. When a child seat is placed in the seat and cinched down, the sensors may read a large mass instead of a child seat. With this condition, there will be high tension in the seat restraint system. Comfort studies have shown that no human occupant would wear their seat restraint that tight. With this information on seat restraint tension, the inflatable restraint system can decide on deployment of the inflatable restraints.

Therefore, it is desirable to provide an assembly for sensing tension in a seat restraint system of a vehicle. It is also desirable to provide an assembly for sensing tension in a seat restraint system in a vehicle that allows a control module to determine the difference between either a child seat or a small or low mass occupant. It is further desirable to provide an assembly for sensing tension in a seat restraint system in a vehicle that integrates a tension sensor with a seat belt buckle to provide an indication of high-tension forces in the seat restraint system. It is still further desirable to provide an assembly for sensing tension in a seat restraint system that can be packaged with a seat belt buckle assembly. Therefore, there is a need in the art to provide a tension sensing assembly that meets these desires.

SUMMARY OF THE INVENTION

Accordingly, the present invention is a tension sensing assembly for a seat restraint system in a vehicle including a rigid frame of a seat restraint buckle of the seat restraint system. The tension sensing assembly also includes a movable member mounted on the rigid frame and adapted to be connected to vehicle structure. The movable member is movable relative to the rigid frame. The tension sensing assembly further includes a magnet mounted to the rigid frame and a Hall effect sensor mounted to the movable member and cooperable with the magnet to change an output of the Hall effect sensor to indicate a tension level in the seat restraint system.

One advantage of the present invention is that a new tension sensing assembly is provided for a seat restraint system in a vehicle. Another advantage of the present invention is that the tension sensing assembly senses tension in the seat restraint system to help identify what is occupying the seat, either a child, child seat, or low mass occupant such as a small adult. Yet another advantage of the present invention is that the tension sensing assembly integrates a tension sensor with a seat restraint or belt buckle of a seat restraint system. Still another advantage of the present invention is that the tension sensing assembly utilizes common components of a tension sensor and buckle latch/unlatch switch A further advantage of the present invention is that the tension sensing assembly allows the sensor and switch function to be common for all different restraint or belt configurations. Yet a further advantage of the present invention is that the tension sensing assembly has a sensor mechanism that is not in the load path of the buckle. Still a further advantage of the present invention is that the tension sensing assembly utilizes a low profile single magnet and Hall effect device with a ferrous insulator. Another advantage of the present invention is that the tension sensing assembly provides a buckle side belt tension sensor that is inexpensive as it uses only one magnet and sensor for two functions. Yet another advantage of the present invention is that the tension sensing assembly is a spring loaded/lost motion buckle assembly.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is an exploded perspective view of the tension sensing assembly of FIG. 1.

FIG. 5 is an exploded perspective view of another embodiment, according to the present invention, of the tension sensing assembly of FIG. 1.

FIG. 6 is a plan view of yet another embodiment, according to the present invention, of the tension sensing assembly of FIG. 1.

FIG. 7 is an exploded perspective view of a portion of the tension sensing assembly of FIG. 6.

FIG. 8 is an exploded perspective view of still another embodiment, according to the present invention, of the tension sensing assembly of FIG. 1.

DESCRIPTION OF THE PREFERRED EMBODIMENT

Figure 1:
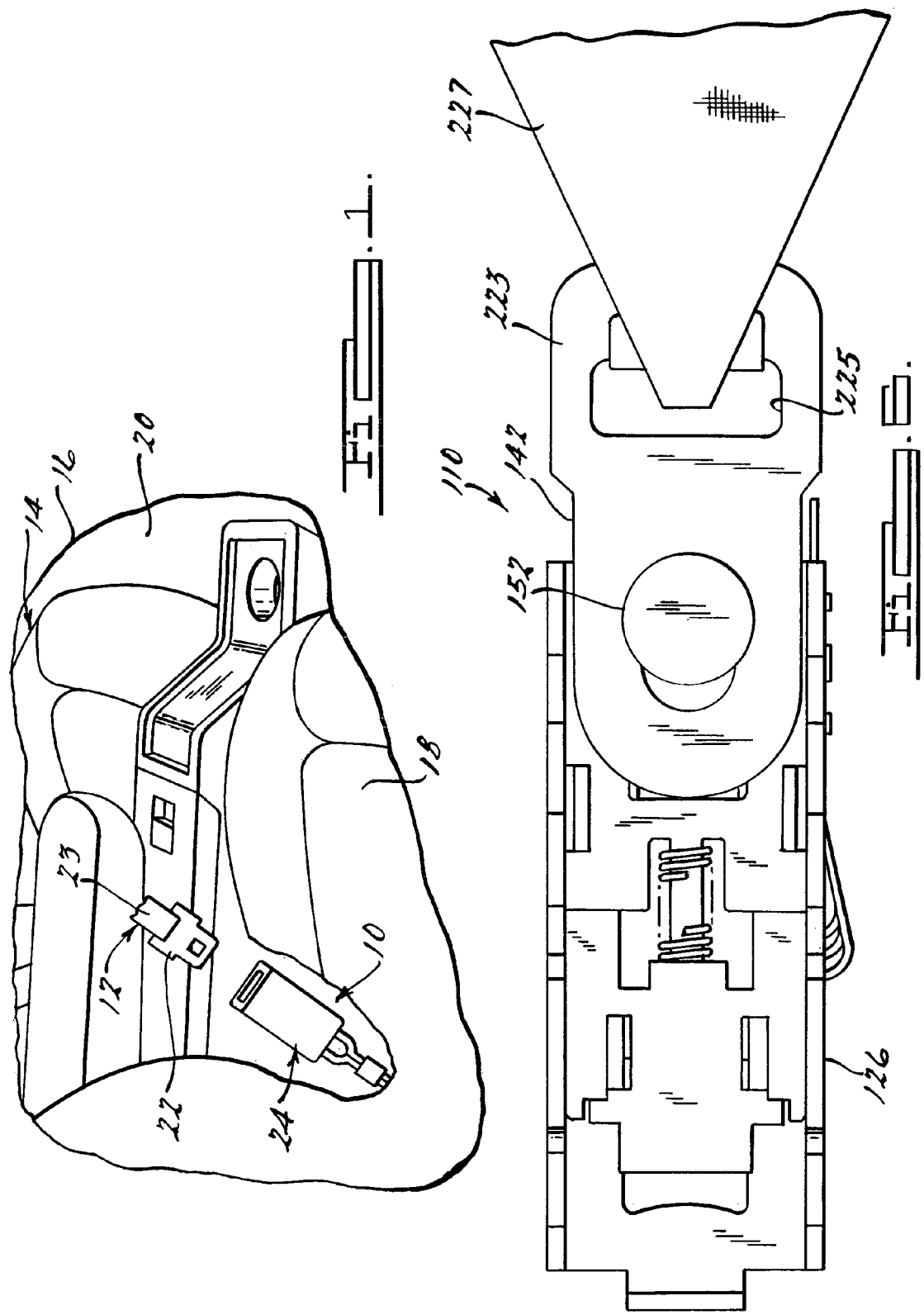
FIG. 1 is a perspective view of a tension sensing assembly, according to the present invention, illustrated in operational relationship with a seat restraint system of a vehicle.

Referring to the drawings and in particular FIG. 1, one embodiment of a tension sensing assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure such as a floorpan (not shown) in an occupant compartment 20 of the vehicle body 16. In this embodiment, the seat 18 is a front seat of the vehicle 14. It should be appreciated that the seat 18 could be a rear, second row, or third row seat for the vehicle 14.

Figure 2:
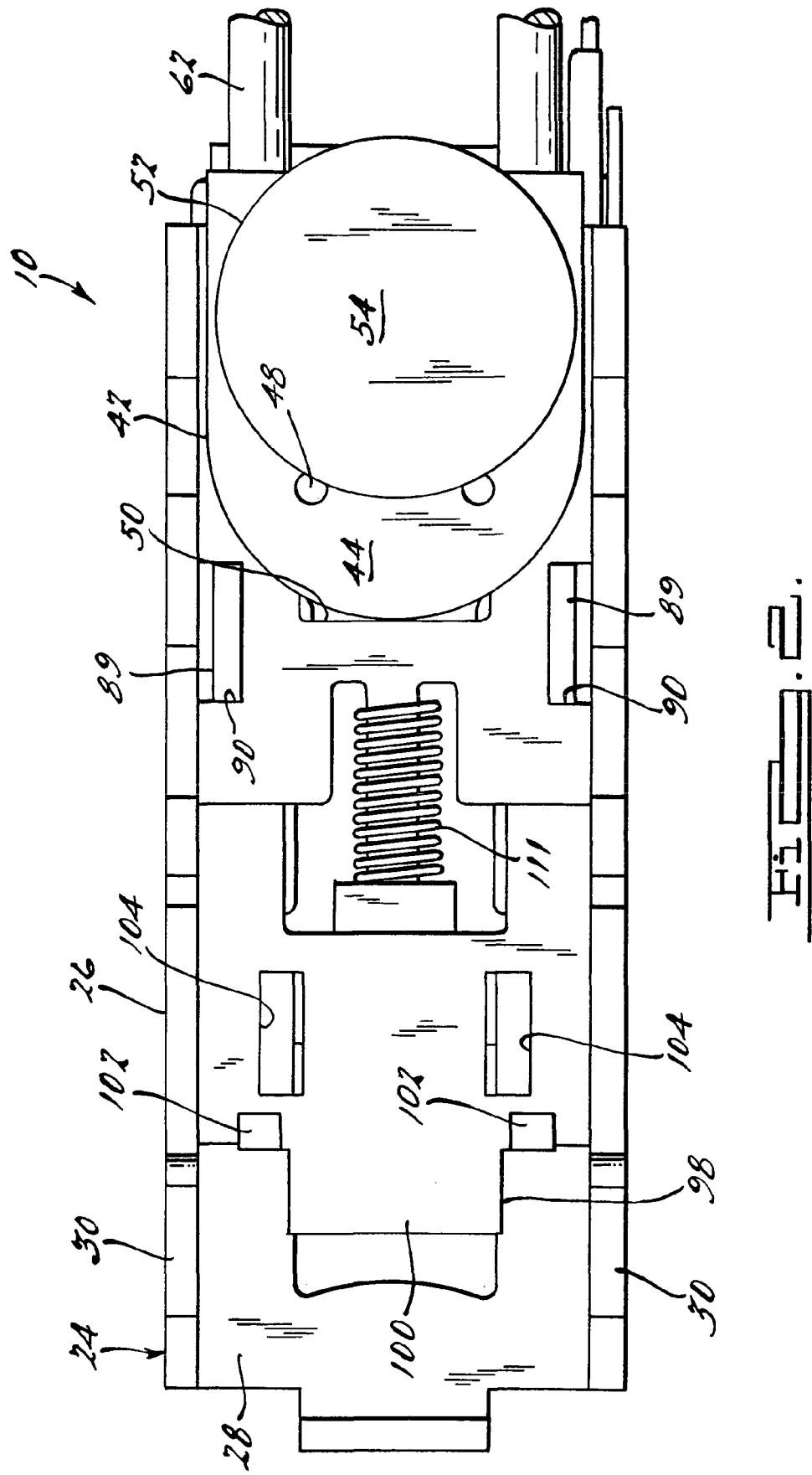
FIG. 2 is a plan view of the tension sensing assembly of FIG. 1.

Referring to FIGS. 1 and 2, the vehicle 14 includes the seat restraint system 12 for restraining an occupant (not shown) in the seat 18. The seat restraint system 12 includes a latch tongue or plate 22 connected to belt webbing 23 at an end of either one of a lap belt, shoulder belt, or both which have another end connected to a retractor (not shown). The seat restraint system 12 also includes a buckle assembly, generally indicated at 24, for receiving the latch plate 22. The tension sensing assembly 10 is connected to the buckle assembly 24 and vehicle structure in a manner to be described. It should be appreciated that the latch plate 22 is engageable and disengageable with the buckle assembly 24. It should further be appreciated that, except for the tension sensing assembly 10 and buckle assembly 24, the seat restraint system 12 and vehicle 14 are conventional and known in the art.

Referring to FIGS. 1 through 4, the tension sensing assembly 10, according to the present invention, is mounted to a rigid frame 26 of the buckle assembly 24. The rigid frame 26 has a generally rectangular base plate or wall 28 and side plates or walls 30, each one of which extends longitudinally and upwardly from a respective longitudinal edge of the base plate 28. The rigid frame 26 includes an aperture 32 extending through a rear end of the base plate 28 for a function to be described. The rigid frame 26 further includes a slot 34 spaced longitudinally from the aperture 32 and extending longitudinally through the base plate 28 for a function to be described. The rigid frame 26 is made of a rigid material, preferably a metal material. The rigid frame 26 is a monolithic structure being integral, unitary, and one-piece. It should be appreciated that the tension sensing assembly 10 is mounted to the rear end of the buckle assembly 24. It should also be appreciated that the tension sensing assembly 10 is integral with the buckle assembly 24. It should further be appreciated that the rigid frame 26 may be similar to that disclosed in U.S. Pat. No. 5,271,129 to Clarke et al.

The tension sensing assembly 10 also includes a movable member such as a cable isolator 36 disposed between the side walls 30 of the rigid frame 26. The cable isolator 36 is generally rectangular in shape and has a lateral width less than a lateral width of the rigid frame 26 between the side walls 30 for sliding movement therein. The cable isolator 36 has an elongated aperture 38 extending generally vertically therethrough for a function to be described. The cable isolator 36 also has a flange 40 extending laterally therefrom to form a generally inverted "U" shape for a function to be described. The cable isolator 36 is made of a rigid material such as plastic or metal and formed as a monolithic structure being integral, unitary, and one-piece.

The tension sensing assembly 10 also includes a movable member such as a cable retainer or tension receiver 42 disposed between the side walls 30 of the rigid frame 26 and over the cable isolator 36. The cable retainer 42 is generally rectangular in shape and has a lateral width less than a lateral width of the rigid frame 26 between the side walls 30 for sliding movement therein. The cable retainer 42 has a generally rectangular base wall 44 and a side wall 46 extending downwardly from a respective edge of the base wall 44 to form a generally inverted "U" shape cross-section for a function to be described. The cable retainer 42 includes an elongated aperture 48 extending generally vertically through the base wall 44 for a function to be described. The cable retainer 42 also has a flange 50 extending downwardly from a front thereof to cooperate with the slot 34 of the rigid frame 26. The cable retainer 42 is made of a rigid material such as plastic or metal and formed as a monolithic structure being integral, unitary, and one-piece.

The tension sensing assembly 10 includes a fastener 52 connecting the cable retainer 42, cable isolator 36, and rigid frame 26 together. Preferably, the fastener 52 is of a rivet type. The fastener 52 has a head portion 54 extending radially and a first shaft portion 56 extending axially from the head portion 46. The fastener 52 also has a second shaft portion 58 extending axially from the first shaft portion 56. The first shaft portion 56 and second shaft portion 58 are generally cylindrical in shape and the head portion 54 is generally circular in shape. The second shaft portion 58 has a diameter less than a diameter of the first shaft portion 56. The head portion 46 overlaps the cable retainer 42. The first shaft portion 56 extends through the elongated aperture 48 in the cable retainer 42 and elongated aperture 38 in the cable isolator 36. The second shaft portion 58 extends through the aperture 32 in the rigid frame 26. The fastener 52 is secured in place by a swaged end portion 60 of the second shaft portion 58. The end portion 60 has a diameter greater than a diameter of the aperture 32 in the rigid frame 26 to prevent the fastener 52 from exiting the rigid frame 26. The fastener 52 is made of a rigid material preferably a metal material. It should be appreciated that the fastener 52 allows the cable isolator 36 and cable retainer 42 to slide a predetermined distance along the rigid frame 26.

The tension sensing assembly 10 further includes a connecting member such as a flexible cable 62 extending through the cable isolator 36 and cable retainer 42 for attachment to vehicle structure. The cable 62 is made of a flexible metal material such as steel. The cable 62 extends through a channel 64 formed between the flange 40 of the cable isolator 36 and the side wall 46 of the cable retainer 42. The free ends of the cable 62 are disposed outside of the rigid frame 26 and are secured together by a cable clamp (not shown). The free ends of the cable 62 extend longitudinally and may be attached to vehicle structure or to a pretensioner (not shown). It should be appreciated that a looped portion of the cable 62 is captured between the cable retainer 42 and the cable isolator 36. It should also be appreciated that the cable 62 may be replaced with a belt webbing as illustrated in FIGS. 6 and 7 or rigid strap as illustrated in FIG. 8 for attachment between the buckle assembly 24 and vehicle structure and are sufficient to withstand loads during a vehicle impact. Is should further be appreciated that the cable 62, cable isolator 36, cable retainer 42, fastener 52, and rigid frame 26 provide a structural attachment of the buckle assembly 24 to the vehicle.

The tension sensing assembly 10 also includes a movable member or sensor retainer 66 disposed on the other side of the base wall 30 of the rigid frame 26. The sensor retainer 66 is generally rectangular in shape. The sensor retainer 66 has at least one, preferably a plurality of spring pockets or cavities 68 extending longitudinally therein for a function to be described. The sensor retainer 66 has a first tab 70 extending longitudinally from a forward end thereof for a function to be described. The first tab 70 is generally rectangular in shape. The sensor retainer 66 has a cavity 71 to receive the flange 50 of the cable retainer 42 and a second tab 72 extending vertically adjacent the cavity 71 for a function to be described. The second tab 72 is generally rectangular in shape. The sensor retainer 66 is made of a rigid material such as plastic or metal and formed as a monolithic structure being integral, unitary, and one-piece. It should be appreciated that the sensor retainer 66 moves longitudinally relative to the rigid frame 26.

The tension sensing assembly 10 also includes a sensor 74 disposed on the first tab 70 of the sensor retainer 66. The sensor 74 is of a Hall effect type, whose voltage level changes relative to a position of a magnet 76 to be described. The sensor 74 is secured to the first tab 70 by suitable means such as an adhesive (not shown). It should be appreciated that the sensor 74, being a Hall effect device, is a programmable linear effect sensor. It should also be appreciated that the sensor 74 moves longitudinally with the sensor retainer 66.

The tension sensing assembly 10 includes a magnet retainer 76 mounted to the rigid frame 26 opposite to and facing the sensor 74. The magnet retainer 76 is generally rectangular in shape. The magnet retainer 76 has a generally rectangular base wall 78 and a pair of opposed side walls 80 extending upwardly from a respective longitudinal edge of the base wall 78 to form a generally "U" shape cross-section. The magnet retainer 76 has an end wall 82 extending upwardly from the base wall 78 at one longitudinal end thereof. The end wall 82 has a projection 84 to be disposed in an aperture 86 of an end flange 88 extending downwardly from a rear end of the rigid frame 26 to secure the magnet retainer 76 to the rigid frame 26. The magnet retainer 76 also has a tab 89 extending upwardly from each side wall 82 to be disposed in an aperture 90 in the base wall 28 of the rigid frame 26 to secure the magnet retainer 76 to the rigid frame 26. The magnet retainer 76 is made of a rigid material such as plastic or metal and formed as a monolithic structure being integral, unitary, and one-piece. It should be appreciated that the sensor retainer 66 moves longitudinally relative to the magnet retainer 76.

The tension sensing assembly 10 also includes at least one magnet 92 cooperating with the sensor 74. The magnet 92 is generally rectangular in shape. The magnet 92 is mounted on the magnet retainer 76 at one end thereof, preferably molded or die-cast into the magnet retainer 76 and charged during assembly. The magnet 92 is spaced vertically from the sensor 74. The magnet 92 is potted or encapsulated and connected by electrical leads or wires 94 to a source of power such as a controller (not shown) of the vehicle.

The tension sensing assembly 10 also includes at least one, preferably a plurality of, more preferably three, springs 96 disposed between the sensor retainer 66 and the magnet retainer 76. The springs 96 are tuned to a predetermined force for a high-tension condition to have an output of approximately eight pounds (8 lb.) to approximately thirty pounds (30 lb.). The springs 96 are of a coil type having a first end disposed in the spring pockets 68 of the sensor retainer 66 and a second end contacting the end wall 82 of the magnet retainer 76. The springs 96 are made of a spring material. It should be appreciated that the springs 96 urge the sensor retainer 66 away from the end wall 82 of the magnet retainer 76.

The tension sensing assembly 10 includes a latch ejector 98 supported by the rigid frame 26. The latch ejector 98 is generally rectangular in shape and has a lateral width less than a lateral width of the rigid frame 26 between the side walls 30 for sliding movement therein. The latch ejector 98 has a ramp portion 100 and a pair of opposed post portions 102 extending upwardly adjacent the ramp portion 102. The ejector 98 also has a pair of apertures 104 spaced laterally and extending therethrough. The ejector 98 has a recess 106 at one longitudinal end and a projection 107 extending into the recess 105. The ejector 98 has a pair of opposed projections 108 extending downwardly to be disposed in a longitudinal slot 109 of the rigid frame 26. A spring 111 is disposed between the ejector 98 and the rigid frame 26 to urge the ejector 98 toward a forward longitudinal end of the rigid frame 26. The ejector 98 is made of a rigid material such as plastic or metal and formed as a monolithic structure being integral, unitary, and one-piece. It should be appreciated that the latch plate 22 has a portion that slides along the ramp portion 100 until engaged by the post portions 102 to move the ejector 98. It should also be appreciated that the ejector 98 moves longitudinally relative to the rigid frame 26.

The tension sensing assembly 10 may include a cover 113 disposed over and cooperating with rigid frame 26 to enclose internal components of the tension sensing assembly 10. It should be appreciated that the cover 113 covers a portion of the buckle assembly 24 and is attached thereto by suitable means.

Figure 9:
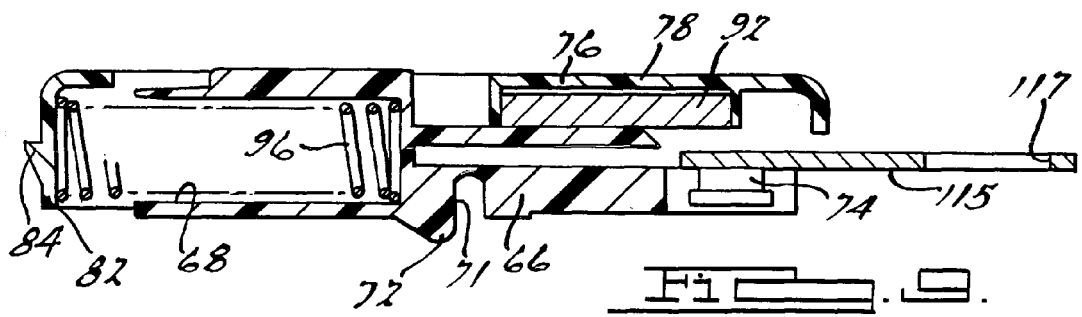
FIG. 9 is a fragmentary inverted elevational view of a portion of the tension sensing assembly of FIG. 1 illustrating an unlatched condition.

In operation of the tension sensing assembly 10, when the latch plate 22 is not latched with the buckle assembly 24 as illustrated in FIGS. 2 and 9, no signal is transmitted by the sensor 74. It should be appreciated that the sensor retainer 66 of the tension sensing assembly 10 is spring loaded to an initial position by the springs 96.

Figure 10:
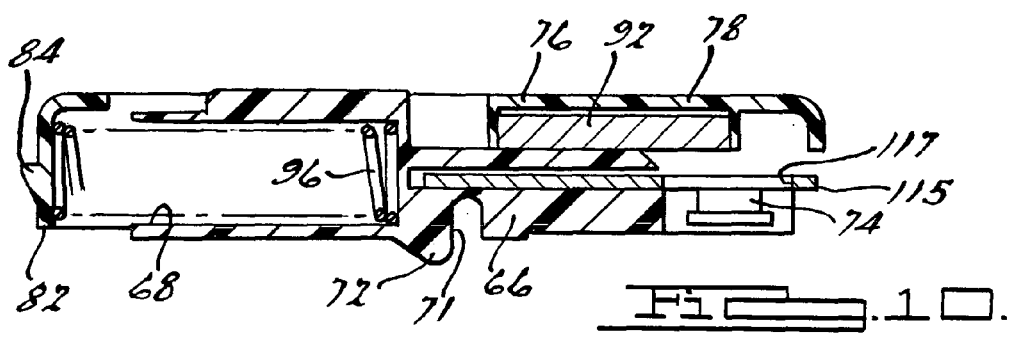
FIG. 10 is a fragmentary inverted elevational view of a portion of the tension sensing assembly of FIG. 1 illustrating a latched condition.

When the occupant buckles the seat restraint system 12 by inserting the latch plate 22 into the buckle assembly 24 as illustrated in FIG. 10, the load path of the buckle assembly 24 is pre-loaded by the springs 96 to the cable 62 through the cable retainer 42, which bottoms out on the rigid frame 26 at the slot 48 on the cable retainer 42 on the flange 50. The tension force on the cable 62 is lower than a predetermined load required to deflect the springs 96. In this state, the tension sensing assembly 10 will send a low voltage signal to the controller, causing the controller to determine that a normal or large mass adult is present in the seat 18. It should be appreciated that the seat restraint system 12 is in a low-tension condition.

Figure 11:
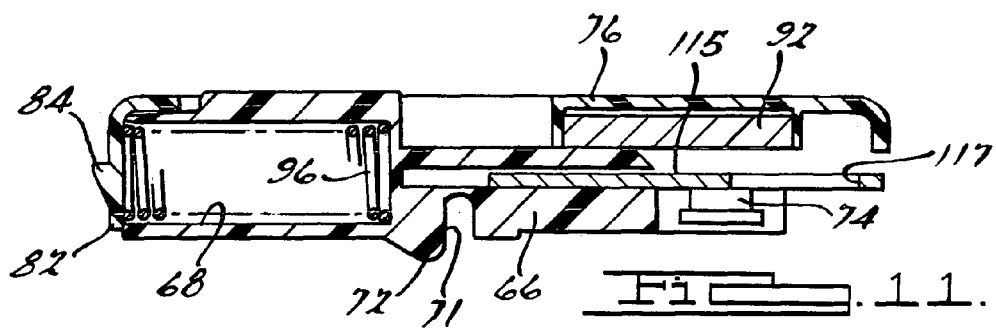
FIG. 11 is a fragmentary inverted elevational view of a portion of the tension sensing assembly of FIG. 1 illustrating a fully tensioned condition.
Figure 4:
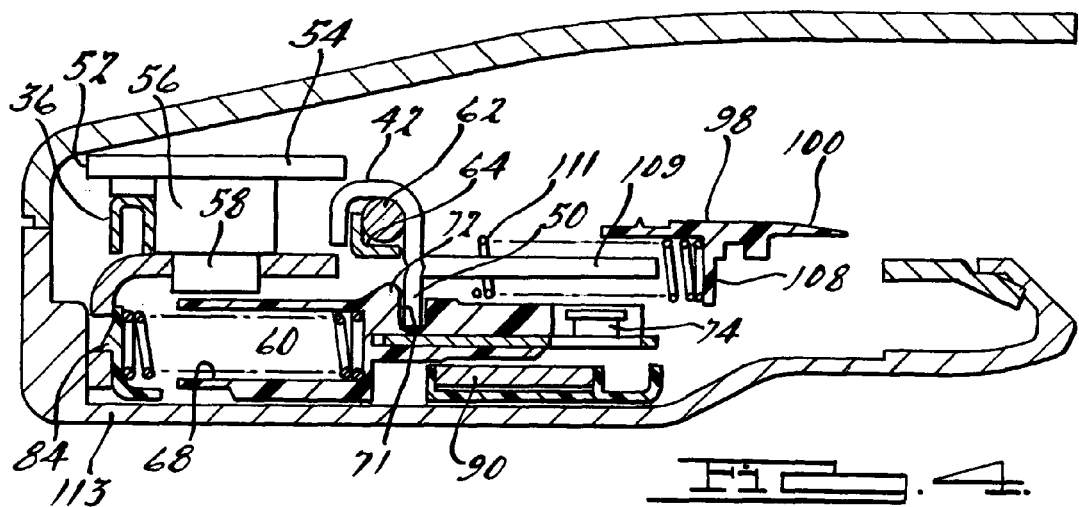
FIG. 4 is a fragmentary elevational view of the tension sensing assembly of FIG. 1.

When a child seat (not shown) is placed in the seat 18 and the seat restraint system 12 is buckled, the belt webbing is cinched to pull the child seat tightly into the seat 18 and the tension is increased in the cable 62. When the tension force of the latch plate 22 exceeds the tension of the springs 96, the buckle assembly 24 moves toward the latch plate 22 and the cable retainer 42 applies the load to the sensor retainer 66, which compresses the springs 96 and allows the buckle assembly 24 and rigid frame 26 to move as illustrated in FIG. 11. This movement allows the magnet 92 to move relative to the sensor 74 mounted in the sensor receiver 66. The change in position of the magnet 92 to the sensor 74 changes the voltage level in the sensor 74, that depending on the position, gives a relative voltage. The relative voltage represents the amount of load the latch plate 22 is applying to the buckle assembly 24 and cable 62. When the load exceeds the tension of the springs 96, the cable 62 bottoms out against the fastener 52 and the load of the latch plate 22 is transferred to the rigid frame 26, the fastener 52, and then to the cable 62. This movement changes the output of the sensor 74, causing the controller to determine that a child seat is present in the seat 18. It should be appreciated that the seat restraint system 12 is in a high-tension condition. It should also be appreciated that when the tension in the cable 62 is lower than the predetermined load, the springs 96 return the sensor retainer 66 to its original position. It should further be appreciated that an audible tone or visual indication may be provided when the tension in the cable 62 is increased above a predetermined level.

The tension sensing assembly 10 sends the output voltage signal to the controller, where a compare function is implemented via a reference resistance value. The controller uses the output signal along with a weight signal from a bladder (not shown) in the seat 18 to decide on deployment of an inflatable restraint (not shown). It should be appreciated that the tension sensing assembly 10 provides additional input to aid in the distinction between a small child in the seat 18 or a rearward facing child seat mounted in the seat 18. It should also be appreciated that if the seat belt tension is greater than a predetermined threshold value, then it is determined to be a child seat and not a human. It should further be appreciated that an audible tone or visual indication may be provided for the tension sensing assembly 10 when the tension in the seat restraint system 12 is increased above a predetermined level. It should be appreciated that the sensor 74 is not is the main load path of the buckle/cable assembly. It should still further be appreciated that the tension sensing assembly 10 could also be used in conjunction with other seat belt applications, e.g., belt tension monitoring during a vehicle impact or comfort systems.

Referring to FIG. 5, another embodiment, according to the present invention, of the tension sensing assembly 10 is shown. Like parts of the tension sensing assembly have like reference numerals. In this embodiment, the tension sensing assembly 10 includes a magnet isolator or switch 115. The magnet isolator 115 is generally rectangular in shape. The magnet isolator 115 includes an aperture 117 extending therethrough for a function to be described. The magnet isolator 115 also has a recess 119 at one longitudinal end and a pair of opposed post portions 121 extending upwardly adjacent the recess 119 for engaging the projections 108 of the ejector 98 to attach the magnet isolator 115 and ejector 98 together. The magnet isolator 115 is made of a metal material. It should be appreciated that the magnet isolator 115 moves with the ejector 98.

In operation of the tension sensing assembly 10 in FIG. 5, the load path operation and the relative movement of the magnet 92 to the sensor 74 is similar to the tension sensing assembly 10 of FIGS. 1 through 4. The difference is that the magnet isolator 115 attached to the ejector 98 is added to slide in the sensor retainer 66. When the buckle assembly 24 is unlatched as illustrated in FIG. 9, the magnet isolator 115 blocks out the magnetic flux of the magnet 92. This keeps the output voltage of the sensor 74 low (>0.5 volts). When the latch plate 22 is inserted in the buckle assembly 24, the ejector 98 attached to the magnet isolator 115 moves and allows the aperture 117 to be directly across from the sensor 74 as illustrated in FIG. 10, which allows the magnetic flux to reach the sensor 74. This allows the voltage to go high (<4.3 volts). This tells the controller the buckle assembly 24 is latched. When tension is applied to the latch plate 22, the springs 96 start to compress and the amount of flux of the magnet 92 reaching the sensor 74 decreases and reduces the voltage as illustrated in FIG. 11. The reduced voltage represents tension on the buckle assembly 24. When full tension is reached as illustrated in FIG. 11, the voltage is greater than 1.5 volts and less than 4.0 volts. It should be appreciated that the tension sensing assembly 10 uses only one magnet 92 and sensor 74 for two functions.

Referring to FIGS. 6 and 7, another embodiment, according to the present invention, of the tension sensing assembly 10 is shown. Like parts of the tension sensing assembly 10 have like reference numerals increased by one hundred (100). In this embodiment, the tension sensing assembly 110 eliminates the cable and cable isolator and configures the cable retainer as a webbing retainer 142. The webbing retainer 142 has an end flange 223 with an aperture or web slot 225 extending therethrough to receive seat belt webbing 227 of the seat restraint system 12. The seat belt webbing 227 has another end (not shown) connected to vehicle structure, such as the floorpan (not shown), by suitable means. The operation of the tension sensing assembly 110 is similar to the tension sensing assembly 10. It should be appreciated that the fastener 152 extends through the aperture 148 of the webbing retainer 142 and allows the webbing retainer 142 to move relative to the rigid frame 126.

Referring to FIG. 8, yet another embodiment, according to the present invention, of the tension sensing assembly 10 is shown. Like parts of the tension sensing assembly 10 have like reference numerals increased by two hundred (200). In this embodiment, the tension sensing assembly 210 eliminates the cable isolator and includes the end of the cable 262 attached to a cable attachment member 329 by suitable means such as crimping or swedging. The cable attachment member 329 has a hollow end portion 331 for receiving the cable 262 which is swedged thereto and a flange portion 333 extending therefrom. The flange portion 333 has an aperture 335 extending therethrough. The fastener 252 extends through the aperture 248 of the cable retainer 142 and allows the cable retainer 142 and cable attachment member 329 to move relative to the rigid frame 226. The operation of the tension sensing assembly 210 is similar to the tension sensing assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tension sensing assembly for a seat restraint system in a vehicle comprising:

a rigid frame of a seat restraint buckle of the seat restraint system;

a sensor retainer mounted on said rigid frame and adapted to be connected to a vehicle structure, said sensor retainer being movable relative to said rigid frame;

a magnet mounted to said rigid frame;

a Hall effect sensor mounted to said sensor retainer and cooperable with said magnet to change an output of said Hall effect sensor to indicate a tension level in the seat restraint system;

an ejector operatively supported by said rigid frame and cooperating with a latch plate of the seat restraint system; and a magnet isolator attached to said ejector to isolate said magnet from said sensor.

2. A tension sensing assembly as set forth in claim 1 including a connecting member operatively connected to said sensor retainer and adapted to be connected to the vehicle structure to move said sensor retainer to change an output of said sensor.

3. A tension sensing assembly as set forth in claim 2 wherein said connecting member comprises a cable having one end adapted to be connected to the vehicle structure and a cable retainer cooperating with said cable and said sensor retainer.

4. A tension sensing assembly as set forth in claim 2 wherein the connecting member comprises a cable having one end adapted to be connected to the vehicle structure, a cable connecting member connected to another end of said cable, and a cable retainer cooperating with said cable connecting member and said sensor retainer.

5. A tension sensing assembly as set forth in claim 2 wherein the connecting member comprises a webbing retainer having one end adapted to be connected to belt webbing and another end cooperating with said sensor retainer.

6. A tension sensing assembly as set forth in claim 1 wherein said magnet isolator has an aperture extending therethrough to allow magnetic flux to pass therethrough.

7. A tension sensing assembly as set forth in claim 1 including a spring cooperating with said ejector to urge said ejector and said magnet isolator away from said sensor.

8. A tension sensing assembly as set forth in claim 1 including a plurality of springs cooperating with said sensor retainer to urge said sensor retainer away from a rear end of said rigid frame.

9. A tension sensing assembly as set forth in claim 1 including a magnet retainer connected to said rigid frame, said magnet being mounted to said magnet retainer.

10. A tension sensing assembly for a seat restraint system in a vehicle comprising:
a rigid frame of a seat restraint buckle of the seat restraint system; a sensor retainer mounted on said rigid frame and movable relative to said rigid frame;
at least one spring disposed between said sensor retainer and said rigid frame to urge said sensor retainer away from one end of said rigid frame;
a magnet mounted to said rigid frame;
a Hall effect sensor mounted to said sensor retainer and cooperable with said magnet; and
a connecting member operatively connected to said sensor retainer and adapted to be connected to a vehicle structure to move said sensor retainer to change an output of said sensor to indicate a tension level in the seat restraint system;
an ejector operatively supported by said rigid frame and cooperating with a latch plate of the seat restraint system; and
a magnet isolator attached to said ejector to isolate said magnet from said sensor.

11. A tension sensing assembly as set forth in claim 10 wherein the connecting member comprises a cable having one end adapted to be connected to the vehicle structure and a cable retainer cooperating with said cable and said sensor retainer.

12. A tension sensing assembly as set forth in claim 10 wherein connecting member comprises a cable having one end adapted to be connected to the vehicle structure, a cable connecting member connected to another end of said cable, and a cable retainer cooperating with said cable connecting member and said sensor retainer.

13. A tension sensing assembly as set forth in claim 10 wherein the connecting member comprises a webbing retainer having one end adapted to be connected to belt webbing and another end cooperating with said sensor retainer.

14. A tension sensing assembly as set forth in claim 10 wherein said magnet isolator has an aperture extending therethrough to allow magnetic flux to pass therethrough.

15. A tension sensing assembly as set forth in claim 10 including a spring cooperating with said ejector to urge said ejector and said magnet isolator away from said sensor.

16. A seat restraint system for a vehicle comprising:
a latch plate;
a seat restraint buckle cooperating with said latch plate and having a rigid frame;
a sensor retainer mounted on said rigid frame and movable relative to said rigid frame;
at least one spring disposed between said sensor retainer and said rigid frame to urge said sensor retainer away from one end of said rigid frame;
a magnet mounted to said rigid frame;
a Hall effect sensor mounted to said sensor retainer and cooperable with said magnet;
an ejector operatively supported by said rigid frame and cooperating with said latch plate;
a magnet isolator attached to said ejector to prevent and allow flux from said magnet to communicate with said sensor; and
a connecting member operatively connected to said sensor retainer and adapted to be connected to vehicle structure to move said sensor retainer to change an output of said sensor to indicate a tension level in the seat restraint system.

* * * * *